United States Patent [19]

Marven

[11] Patent Number: 4,663,099

[45] Date of Patent: May 5, 1987

[54] METHOD AND APPARATUS FOR PRODUCING SEPARATE UNAGGLOMERATED PELLETS OF AN EXTRUDABLE MATERIAL

[75] Inventor: Robert Marven, Oxfordshire, England

[73] Assignee: Extrudaids Limited, Lewknor, England

[21] Appl. No.: 714,512

[22] Filed: Mar. 21, 1985

[30] Foreign Application Priority Data

Mar. 21, 1984 [GB] United Kingdom ............... 8407352

[51] Int. Cl.[4] .............................................. B29B 9/06
[52] U.S. Cl. ................................. 264/142; 264/237; 425/311
[58] Field of Search ............... 264/54, 142, 143, 237; 425/311

[56] References Cited

U.S. PATENT DOCUMENTS

| | | | |
|---|---|---|---|
| 2,850,764 | 9/1958 | Evans et al. | 264/143 |
| 4,264,553 | 4/1981 | Loo | 264/142 |
| 4,300,877 | 11/1981 | Andersen | 264/142 X |
| 4,385,016 | 5/1983 | Gwinn | 264/54 X |
| 4,461,737 | 7/1984 | Voss | 264/142 |

FOREIGN PATENT DOCUMENTS 2069922A 9/1981 United Kingdom .

Primary Examiner—Philip Anderson
Attorney, Agent, or Firm—Saidman, Sterne, Kessler & Goldstein

[57] ABSTRACT

An extruder head 1 for molten material such as polymer has a die plate 6 orificed at 5, rotating blades 11 sweeping over the die plate to operate and fling outwards emerging short lengths 22 of molten material, and a surrounding freestanding wall or curtain of high-pressure water 14 around the blades to entrap and cool separate cut lengths without agglomeration. The wall of water can be formed of merging, or overlapping, flat jets from nozzle 13, and must be essentially uninterrupted viewed from the center of the die plate.

21 Claims, 6 Drawing Figures

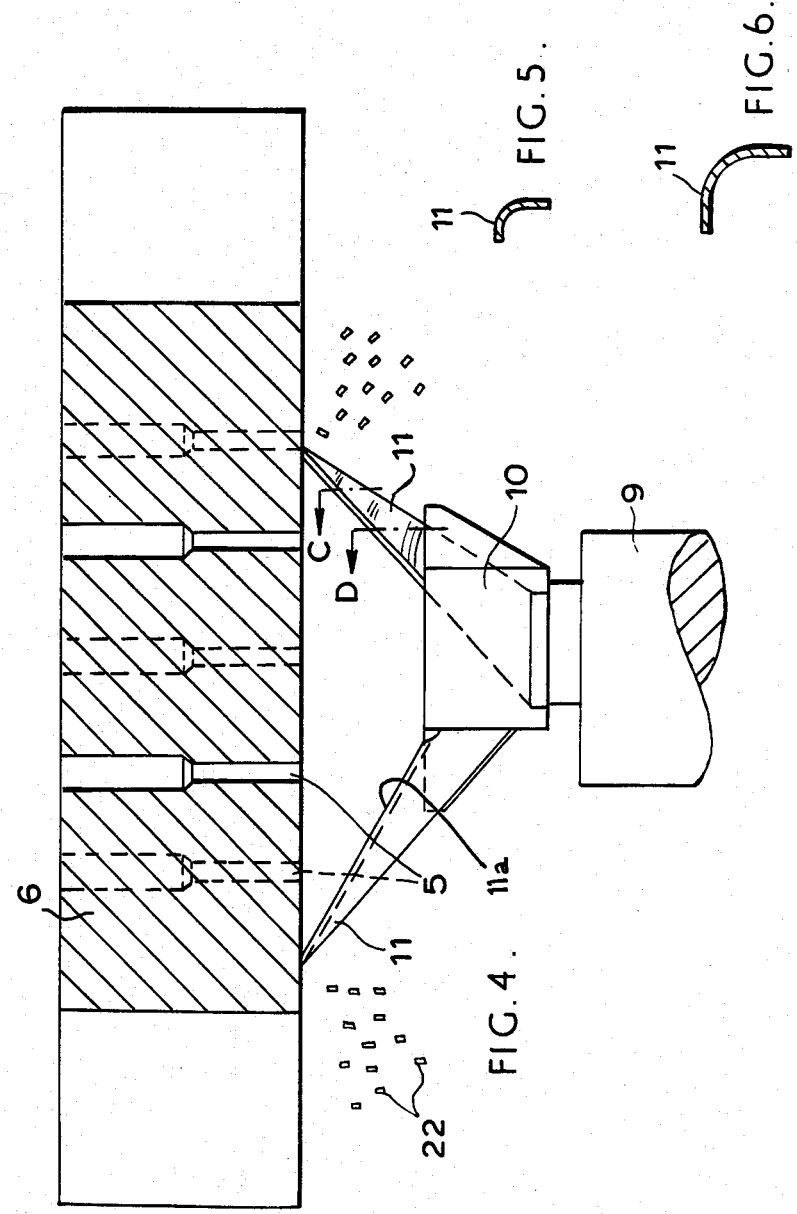

METHOD AND APPARATUS FOR PRODUCING SEPARATE UNAGGLOMERATED PELLETS OF AN EXTRUDABLE MATERIAL

This invention relates to a method and apparatus for producing pellets or granules of material, usually a polymer (such as a reclaimed material from polymer scrap) but possibly cheesy or like foodstuffs, or extruded molten metal, or pitch. Polymers will be described below as being typical.

Conventional processes of polymer fabrication generate a proportion of clean scrap polymer, for example as start-up waste, trimmings during operation, or rejected products. This expensive material has not been significantly degraded by one extrusion process and is advantageously reclaimed, usually in the form of pellets, e.g. for admixture with new pelletised starting material. To some extent, moreover, it is possible to reclaim scrap material after use, provided that care is taken to avoid contamination.

Such reclamation may be effected by melting the material, extruding the molten material as strands through an orifice plate, and cutting the strands into short pelletsize lengths, as they emerge from the orifices, by one or more blades passing over the plate.

Typically, the knife blades are arranged as a rapidly rotating rotary unit so that they not only cut the product into granules or pellets but also throw the granules and pellets outward, whereby they travel separately through the air, become to some extent cooled, and therefore do not agglomerate.

In known equipment this takes place within surrounding walls defining a granulating chamber, against which walls the pellets or granules strike and from which they rebound to fall by gravity out of a bottom opening. In practice, however, it has been found that at higher operational requirements, that is to say, faster material throughput and consequentially faster rotation of the rotary knife unit, two possible sources of malfunction may arise. Firstly, the pellets may not cool adequately, possibly because of the greater heat input into the chamber, whereby they tend to agglomerate on the chamber walls. Secondly, those pellets which do cool enough not to agglomerate on the walls may rebound too energetically and collide with warm pellets coming off the blades, forming agglomerates which then accumulate on the walls as such.

To overcome these problems it has been proposed to provide a film of water on the surrounding chamber surface, in order both to cool the granules and to prevent agglomeration. For example, British Pat. No. 2 069 922B describes a specially shaped chamber into which water is supplied under the cover at the centre (that is to a duct surrouding the extrusion head) and fed radially outwards so as to form a moving film over the inside of the cover and thereafter down the converging frustoconical walls of the chamber. We have established, however, that problems can arise with the stability of such a supported water film, due for example to fluctuation of water pressure, or interruptions in the water supply, or due to an (initially small) random agglomeration causing a film rupture and permitting an increasing area to dry out and give rise to agglomerations. Thus, high operational loads over a variety of products are not always possible.

We have now discovered that these problems may be overcome by providing an essentially uninterrupted rapidly moving free standing curtain or wall of cooling fluid such as water around the blades which generally speaking combines the functions of both the film of water and the surrounding chamber wall as utilised in the prior art, and possesses moreover certain further advantages.

In one aspect therefore the invention consists in an extruder head comprising an orificed die plate and a rotary unit rotatable about an axis at right angles to the die plate and carrying blades shaped so as both to cut off short lengths of emerging material as extruded through the orifices and then to fling the cut lengths rapidly outwards: in which means are provided to form at least one rapidly moving free standing and surrounding curtain or wall of cooling fluid such as water around the blades so as to entrap and cool separate cut lengths, the supply of water, viewed in any direction from any extrusion orifice, being essentially uninterrupted.

The extruder head may be placed to extrude material vertically downwards, or horizontally outwards; the means for providing the wall of water will be such as to give a downwardly or outwardly moving curtain respectively.

The rotary means usually comprises a blade support mounted at one end of a rotary shaft. If the extruder is vertical the shaft can pass through the head. If the extruder is horizontal the shaft can be external to the head. In either case, the number of blades is a matter of choice, although they should not produce so many granules as to form agglomerations in their travel before they hit the water. From 1 to 4 blades is preferable. The blades may either contact the face of the die plate or be slightly spaced therefrom.

The means utilised to provide the curtain of water is preferably a plurality of nozzles, usually equally spaced around a circular or like periphery (and usually concentric with the extruder plate and rotary unit) each providing a flat or possibly curved high pressure jet such that the jets jointly form a curtain of rapidly moving high pressure water. Six to 20, usually about 12, of such jets are envisaged.

A protective casing may be provided around the jet locations, since high pressure water (e.g. about 3000 psi) is dangerous. If so, such a casing will have the bottom opening in the curved wall or in a flat base depending upon the jet orientation. This opening provides for onward flow of water and of cut pellets or granules.

Further aspects of the invention are constituted by (a) the extruder including such as extruder head or (b) a bolt-on unit especially for a horizontal-extruding head comprising a surrounding casing supporting both the means for supplying the water and the rotary unit, and having an opening at the underside for removal of pellets and water.

A yet further aspect of the invention is constituted by a method of producing separate unagglomerated pellets of material extrudable through a multi orificed die and capable of being cooled to solid form thereafter, in which one or more blades are repeatedly swept across the face of the die to cut off emerging short lengths of molten material and fling them outwards by centrifugal force, and in which the short lengths are trapped in and cooled by at least one essentially uninterrupted rapidly moving free standing surrounding curtain or wall of water.

Two or more concentric curtains are feasible, but not usually necessary. The blades are usually rotary operated for example at a rate from 200 to 3000 rpm.

The material upon which the method is carried out is usually a polymer, such as a polyolefin (polypropylene, polyethylene or PP/PE copolymer) polyvinylchloride, polyester, polyamide, or in general any thermoplastic polymer. It is possible moreover to pelletise foodstuffs, metals or pitches in this fashion.

The invention will be further described with reference to the accompanying drawings in which:

FIG. 4 is a section on E—E of FIG. 3;

FIG. 5 is a section at C of the blade in FIG. 4;

FIG. 6 is a section at D of the blade in FIG. 4.

Figure 1:
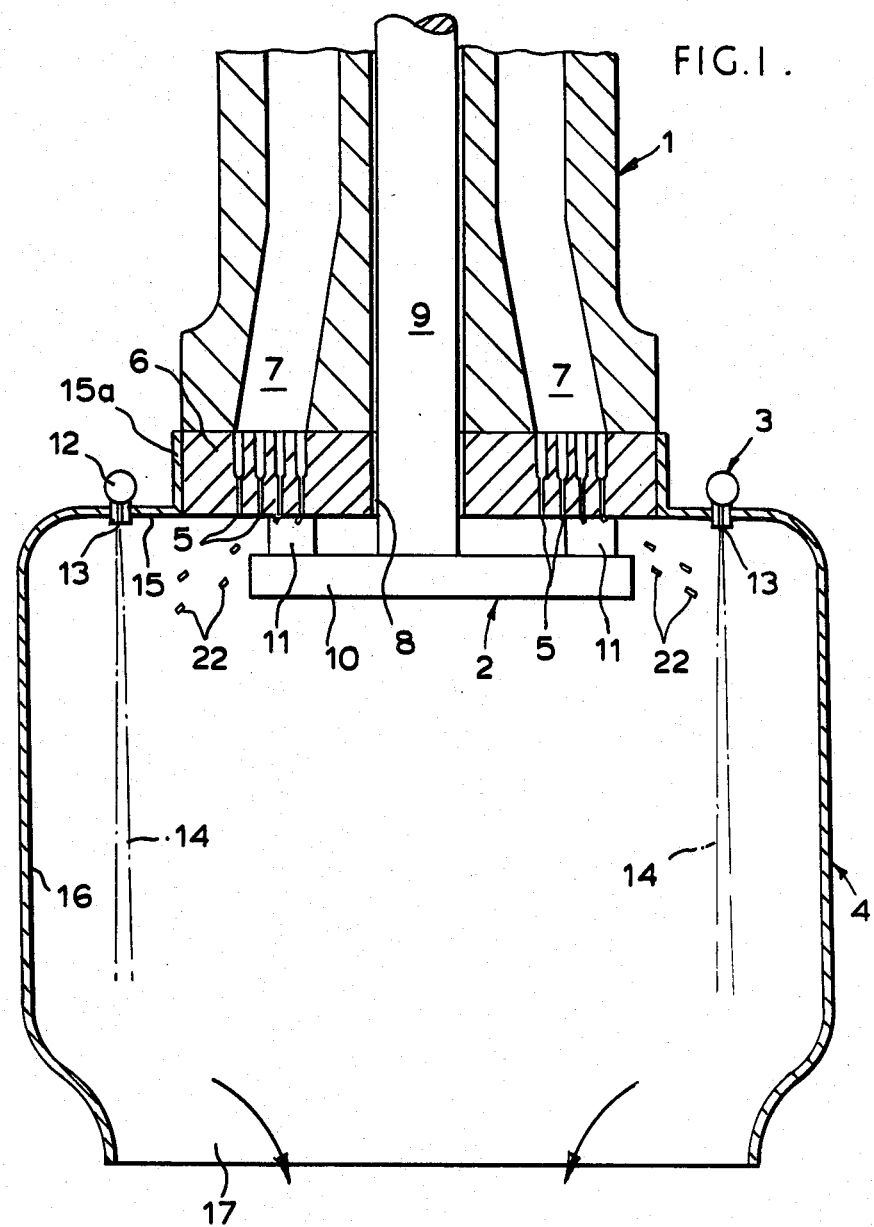
FIG. 1 shows a vertical section through a vertically operating extruder head fitted with a rotary blade and with means for providing a restraining water curtain in accordance with the invention.

The device shown in FIG. 1 comprises generally an extruder head 1, a rotary unit 2, a high pressure water system 3 and a surrounding protective casing 4.

The extruder head can be of any conventional design, and attached to any conventional extruder. The design shown feeds concentric circles of orifices 5 (as described in more detail below) in the die plates 6 with molten polymer through annular ducts 7. It further possesses a central bore 8 to support for rapid driven rotation the shaft 9 of the rotary unit 2.

This rotary unit 2 also comprises an end support plate 10 upon which are located two shaped blades 11 also discussed in more detail below, which move rapidly across the orifices 5 to cut pellets or granules from the emerging polymer strands and thereafter fling the pellets outwardly.

Spaced concentrically around the extruder head 1 and the rotary unit 2 is the high pressure water supply system 3, including a high pressure annular hose 12 and flat-jet nozzles 13, which jointly provide an essentially uninterrupted curtain of cooling fluid such as water surrounding the rotary unit 2, composed of separate jets 14 (see also FIG. 3) all directed downwards.

A surrounding protective casing 4 is also generally concentric with the rotary unit 2; it is an integral structure with a top surface 15, shaped at 15a for attachment to the extrusion head and conveniently carrying the hose 12 of the water supply system, a curved side wall 16 and a bottom outlet 17.

Figure 2:
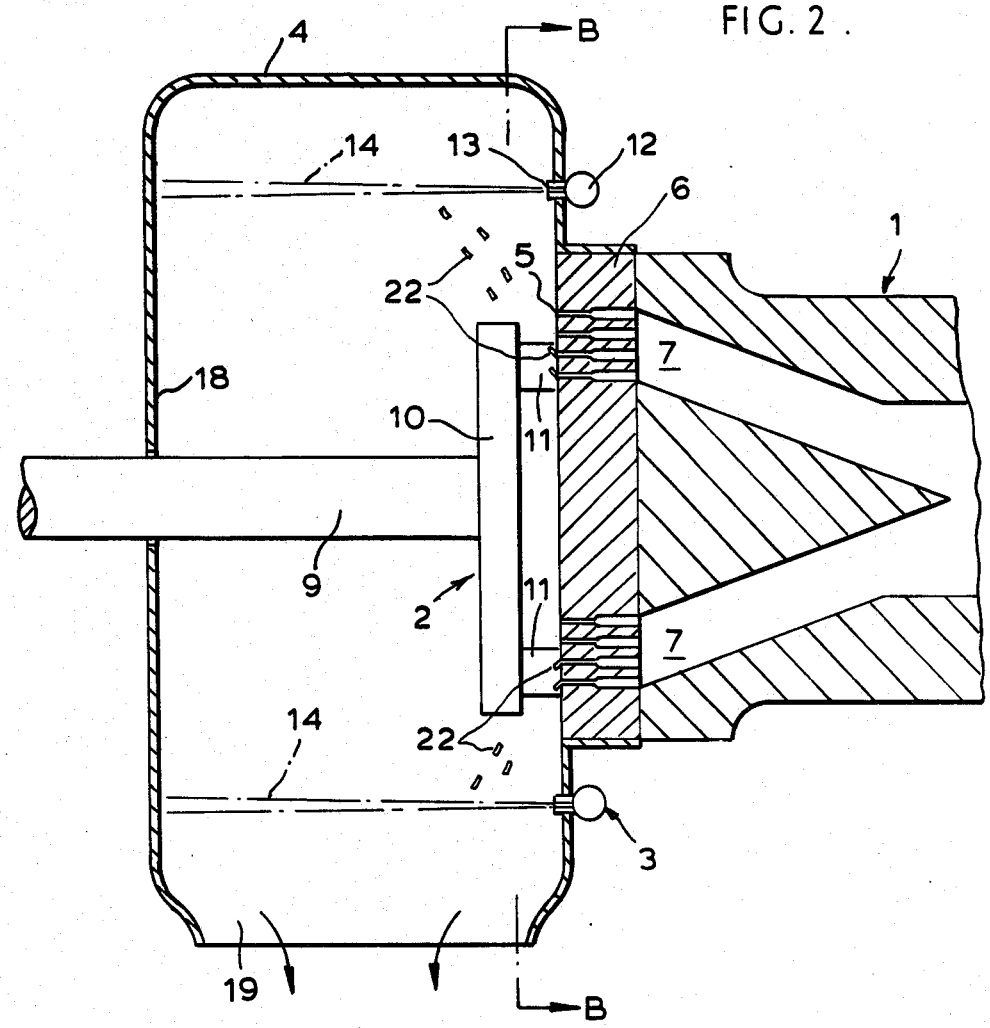
FIG. 2 shows a vertical section through a similarly equipped but horizontally operating extruder head.

FIG. 2 shows a similar device, and to that extent is similarly referenced. However, in FIG. 2 jets 14 are directed horizontally and impinge upon a flat end wall 18 of casing 4, eventually splashing back and falling out of the bottom opening 19 in the curved wall of this casing (see also FIG. 3).

Because of this orientation, the driven shaft of the rotary unit does not need to pass through the head 1 but can enter through end wall 18. This is a cheaper construction and easier to adjust in use.

Figure 3:
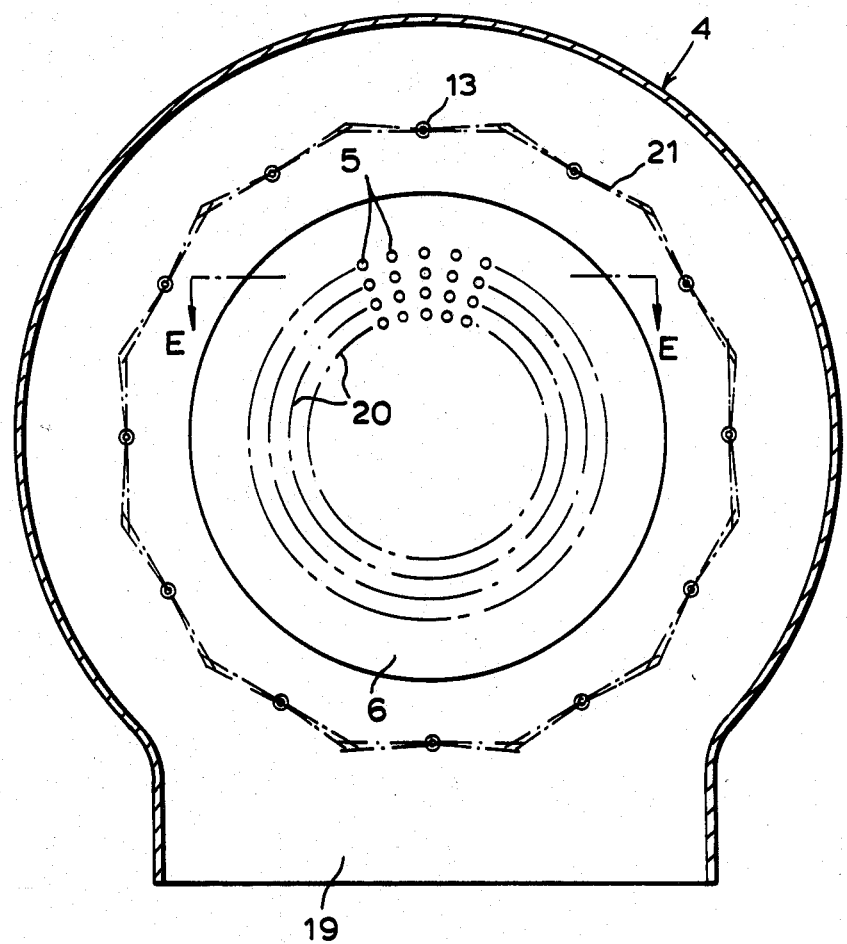
FIG. 3 is a section on B—B of FIG. 2.

FIG. 3 shows the die plate 6 within one end of the casing 14 with the rotary unit removed. The arrangement of orifices 5, arranged in concentric circles 20 to the number desired is convenient and convenient in the practice of the invention. The arrangement of jets is however novel. In the examples shown twelve equispaced jet nozzles 13 are each of the type to produce a flat jet 14 starting very near the nozzle itself and of a size and length such that the jets jointly produce an essentially uninterrupted wall or curtain 21 concentric with the axes of the rotary unit and extrusion head.

FIG. 4 shows a section at E—E, with the rotary unit (of different detailed design from the previously shown) replaced. The shape of orifices 5 in the die plate is again conventional. Two blades 11 are shown; one or more may be used. They are so shaped that their cutting edge 11a which is usually at but possibly slightly spaced from the die plate is oriented in relation to the blade so as to exert not only a cutting effect at the strand but also a centrifical throwing effect on the separate pellets. FIGS. 5 and 6 show the successive cross-sections which assist in achieving this end.

In use, scrap polymer is melted in the extruder barrel (not shown), and pumped via duct 7 to orifices 5 where it starts to extrude. The rotary unit causes the blades to pass rapidly across the face of die plates 6, either touching or very slightly spaced from its surfce. This cuts off short granules of pellets 22, which are still molten or adherent at their surface. They are flung outwards and therefore meet the continuous curtain of cooling fluid jointly provided by jets 14. Pellets or granules enter this curtain of water and are cooled. They are also conveyed rapidly along the curtain of cooling fluid which is in constant motion. Thus, they stay in rapid movement and undergo rapid cooling whereby there is no tendency to agglomerate. The coolant and solidified separate pellets or granules fall together out of the protected housing at 17 or 19 and can be separated at a grid, the coolant for recycling and the pellets for drying.

As minor features of operation, there may be noted:

1. It is desirable to keep water away from the extruder plate as much as possible. In practice, the jets may dribble laterally (e.g. in FIG. 1) and to overcome this an internal bead or rim may be formed at the protective housing for example opposite to the external rim 15a and extending inwards to an extent adequate to prevent coolant access but not so much as to cause pellets to impinge upon it. Splash back at end wall 18 can be minimised by suitable shaping or spacing from the head.

2. The high pressure of the jets and the centrifugal force on the granules are usually such that the force of gravity, although of course acting on the water curtain or pellets in the embodiment of FIG. 2, is of secondary importance and does not affect operations.

3. The pellets or granules are usually, by design, not able to penetrate the curtain of cooling fluid. It may happen that a proportion of pellets or a few pellets pass through the cooling fluid. However, their outward momentum is so much reduced, and the downward momemtum so much increased by this passage through the cooling fluid that even these pellets will fall downwards close to the outside of the curtain. In other words the surrounding wall 16 does not have an impingement function, or produce agglomeration, as in the prior art but serves as a protection against splashing of or accident to operatives from the dangerous high pressure jets 14.

Various modifications may be made within the scope of the invention. For example, it will be understood by a man skilled in the art that although the jets are stated to be such as to give an essentially uninterrupted curtain, this absence of interruption must be seen in the light of the path of travel of the granules. Thus, as long as there is a complete wall of cooling fluid viewed from a notional view point at the centre of the extrusion plate the function of the invention is generally fulfilled, It is believed preferable, however, to arrange the jets so that they form a cylindrical or polygonal curtain even though tangentially oriented gaps between them may be possible.

I claim:

1. A method of producing separate unagglomerated pellets of material extrudable through a multi-orificed die when molten and capable of being cooled to solid form thereafter, in which one or more blades are repeatedly swept across the face of the die to cut off emerging short lengths of molten material and fling them outwards by centrifugal force, and in which the short lengths are trapped in and cooled by at least one essentially uninterrupted rapidly moving free standing surrounding wall of water displaced radially outwardly from said one or more blades.

2. A method as claimed in claim 1 in which the blades are mounted on a shaft which is mounted for rotation at a speed of from about 200 r.p.m. to about 3000 r.p.m.

3. A method for producing discrete pieces of extruded material, comprising:
   extruding material through an orifice of a die plate;
   cutting said extruded material into discrete pieces of predetermined size as said material emerges from said orifice of said die plates; and
   directing a rapidly moving, free standing thin wall of fluid displaced radially outwardly from said orifice and extending in a direction generally transverse to the direction of cutting; and
   cooling said discrete pieces in said free standing thin wall of fluid.

4. The method for producing discrete pieces of extruded material of claim 3, wherein said cutting is performed by at least one rotatably-mounted blade which is rotated past said orifice at a rate of from about 200 r.p.m. to about 3,000 r.p.m.

5. The method for producing discrete pieces of extruded material of claim 3, wherein said pieces are cast radially outwardly from said orifice upon cutting and into said fluid wall.

6. An extruder head comprising a die plate; a plurality of orifices in said die plate; a rotary unit rotatable about an axis at right angles to said die plate; blades carried by said rotary unit; edges on said blades located to sweep over said die plate and to cut off short lengths of emerging material as extruded through the orifices, the shape of said blade being such as to fling the cut lengths rapidly outwards; and water supply means for forming at least one rapidly moving free standing and surrounding wall of water displaced radially outwardly from said rotary unit and extending substantially transversely to the direction of rotation of said rotary unit so as to entrap and cool separate cut lengths cast into said wall after cutting, whereby the supply of water, viewed in any direction from any extrusion orifice, is essentially uninterrupted.

7. An extruder head as claimed in claim 6 oriented vertically downwardly, and having the said water supply means such as to give a downwardly moving wall.

8. An extruder head as claimed in claim 7 wherein said rotary unit comprises a rotary shaft which passes through said extruder head and die plate, and a blade support for carrying said blades to sweep over said die plate.

9. An extruder head as claimed in claim 6 oriented horizontally outwards, to provide the wall of water such as to give a outwardly moving wall.

10. An extruder head as claimed in claim 9 wherein said rotary unit comprises a rotary shaft external to said extruder head and die plate, and a blade support for carrying said blades to sweep over said die plate.

11. An extruder head as claimed in any one preceding claim in which from 6 to 9 blades are present.

12. An extruder head as claimed in claim 6 in which the said water supply means comprises a plurality of nozzles, spaced round a periphery, each nozzle producing a jet shaped such that the jet jointly form the curtain of water.

13. An extruder head as claimed in claim 12 in which the said nozzles are equally spaced around a circular periphery concentric with the said die plate.

14. An extruder head as claimed in claim 12 in which said jets are essentially flat in cross-section.

15. An extruder head as claimed in claim 12 in which from 6 to 20 of such jets are present.

16. An extruder head as claimed in claim 6 which further comprises a surrounding casing supporting both the water supply means and the rotary unit, said casing having an opening at the underside for removal of pellets and water.

17. An apparatus for producing discrete pellets of extruded material, comprising;
   a die plate having a plurality of extrusion orifices through which the material is extruded;
   a rotatable cutter fixedly mounted to an end of a cutter shaft, said shaft being axially mounted and substantially aligned with said die plate, said cutter having a blade for cutting the extruded material into discrete pellets of predetermined length and casting said pellets radially outwardly therefrom; and
   means for supplying a rapidly moving, free standing thin wall of fluid displaced radially outwardly from said cutter blade and extending in a direction generally parallel to said cutter shaft for receiving and cooling only said pellets of extruded material after they have been cut and cast therein.

18. The apparatus for producing discrete pellets of extruded material of claim 14, wherein said fluid supplying means comprises a plurality of fluid dispensing nozzles circumferentially spaced about said die plate.

19. The apparatus for producing discrete pellets of extruded material of claim 18, further comprising a casing having a sidewall and an outlet, said nozzles being mounted to said casing so that fluid is dispensed into said casing in a direction generally parallel to said sidewall, said fluid and said pellets exiting said casing through said outlet.

20. The apparatus for producing discrete pellets of extruded material of claim 17, wherein said die plate includes a bore for receiving said cutter shaft.

21. The apparatus for producing discrete pellets of extruded material of claim 19, wherein said plurality of extrusion orifices are oriented substantially parallel to said cutter shaft.

* * * * *